(12) United States Patent
Malecki

(10) Patent No.: US 11,819,005 B2
(45) Date of Patent: Nov. 21, 2023

(54) CLEANING UNIT FOR A CLEANING DEVICE FOR CLEANING TEATCUPS OF A MILKING APPARATUS, AND A CLEANING DEVICE

(71) Applicant: DELAVAL HOLDING AB, Tumba (SE)

(72) Inventor: Krzysztof Malecki, Tumba (SE)

(73) Assignee: DeLaval Holding AB, Tumba (SE)

( * ) Notice: Subject to any disclaimer, the term of this patent is extended or adjusted under 35 U.S.C. 154(b) by 565 days.

(21) Appl. No.: 16/972,281

(22) PCT Filed: May 29, 2019

(86) PCT No.: PCT/SE2019/050496
§ 371 (c)(1),
(2) Date: Dec. 4, 2020

(87) PCT Pub. No.: WO2019/235991
PCT Pub. Date: Dec. 12, 2019

(65) Prior Publication Data
US 2021/0235660 A1 Aug. 5, 2021

(30) Foreign Application Priority Data

Jun. 5, 2018 (SE) .................................. 1850684-0

(51) Int. Cl.
*A01J 7/02* (2006.01)
(52) U.S. Cl.
CPC ..................................... *A01J 7/025* (2013.01)
(58) Field of Classification Search
None
See application file for complete search history.

(56) References Cited

U.S. PATENT DOCUMENTS

| 6,418,877 B1 | 7/2002 | Fredericks et al. |
| 2017/0188537 A1 | 7/2017 | Theis et al. |

FOREIGN PATENT DOCUMENTS

| DE | 10 2008 027 277 | 12/2009 |
| EP | 2 362 724 | 9/2011 |

(Continued)

OTHER PUBLICATIONS

Search Report for SE Application No. 1850684-0 dated Jan. 10, 2019, 2 pages.

(Continued)

*Primary Examiner* — Rita P Adhlakha
(74) *Attorney, Agent, or Firm* — NIXON & VANDERHYE

(57) ABSTRACT

A cleaning device includes cleaning units (3) for receiving and cleaning teatcups (7). The cleaning unit includes a cup-shaped member (10). The cup-shaped member includes an annular bottom surface (12) extending around a longitudinal central axis (x) of the cleaning unit, and a side surface (13) extending around the annular bottom surface and facing the longitudinal central axis. Ribs (14) protrude from the annular bottom surface and have an extension between an inner position (A) and an outer position (B) on the annular bottom surface. The inner position is located more closely to the longitudinal central axis than the outer position. The ribs are configured to create a gap (15) between the annular bottom surface and an end surface (8) of a teatcup received in the cleaning unit. Each of the ribs is curved along at least a part of the extension.

20 Claims, 4 Drawing Sheets

(56) References Cited

FOREIGN PATENT DOCUMENTS

| | | |
|---|---|---|
| SE | 522 257 | 1/2004 |
| SE | 0701434 | 2/2008 |
| WO | 03/086054 | 10/2003 |
| WO | 2010/052250 | 5/2010 |

OTHER PUBLICATIONS

International Search Report for PCT/SE2019/050496 dated Sep. 4, 2019, 3 pages.
Written Opinion of the ISA for PCT/SE2019/050496 dated Sep. 4, 2019, 6 pages.

CLEANING UNIT FOR A CLEANING DEVICE FOR CLEANING TEATCUPS OF A MILKING APPARATUS, AND A CLEANING DEVICE

This application is the U.S. national phase of International Application No. PCT/SE2019/050496 filed May 29, 2019 which designated the U.S. and claims priority to SE Patent Application No. 1850684-0 filed Jun. 5, 2018, the entire contents of each of which are hereby incorporated by reference.

TECHNICAL FIELD OF THE INVENTION

The present invention refers generally to the cleaning of the teatcups of a milking apparatus. In particular, the present invention refers to a cleaning unit according to the preamble of claim 1. Furthermore, the present invention refers to a cleaning device for cleaning of teatcups of a milking apparatus.

BACKGROUND OF THE INVENTION AND PRIOR ART

One problem of the known cleaning units is that dirt and other particles, such as microorganisms, may collect and build up agglomerations in the cup-shaped member, in particular in the corner between the annular bottom surface and the side surface, and at various types of protrusions for creating a gap or a distance between the cup shaped member and a surface of a teatcup received therein for enabling cleaning fluid to reach outer surfaces of the teatcup. Such agglomerations may deteriorate the hygienic condition of the cleaning unit, and in a worse case result in contamination of the teatcup. Ribs are a possible type of protrusions for creating said gap or distance, but also when using ribs, there is a risk that particles build up agglomerations.

U.S. Pat. No. 6,418,877 discloses a jetter cup for washing milking equipment, which includes a cup having a sidewall and a bottom wall defining therein a cavity, a tube having a passageway, and an annular lip having a central opening. The jetter cup facilitates insertion of a mouthpiece of a teatcup liner into the cavity by the provision of ramping bosses circumferentially spaced around the outer surface of the lip, a circumferentially extending groove along the inside of the sidewall at the junction between the lip and the sidewall, and the provision of a plurality of upright ribs along the sidewall which preferably extend downwardly to the bottom wall.

EP 2 362 724 discloses a cleaning unit for cleaning at least one head section of a teatcup. The cleaning unit comprises a chamber that has a substantially circular cross-section, is delimited by a wall and has an opening delimited by a sealing element. The chamber has at least one inlet. At least one section of the sealing element or at least one section of the wall adjoining the opening and a section of the sealing element is or are flexible around the circumference of the chamber.

SUMMARY OF THE INVENTION

The purpose of the present invention is to remedy the problems discussed above and to prevent build-up of agglomerations of dirt and other particles in the cleaning unit.

This purpose is achieved by the cleaning unit initially defined, which is characterized in that each of the ribs is curved along at least a part of the extension.

Thus, each of the ribs is curved when seen in the direction of the longitudinal central axis. Each of the ribs may be curved along a part of the extension or along the whole extension, i.e. from the inner position to the outer position.

Thanks to the curved extension of ribs, the liquid, which is supplied and introduced into a gap, may be forced to rotate and to reach all areas of the annular surface, in particular the corner between the annular bottom surface and the side surface, and the curved ribs. A more efficient rinsing of the cup-shaped member may thus be achieved, preventing any build-up of agglomerations of dirt and other particles.

According to an embodiment of the invention, at least said part of the extension of each of the ribs extends along a part of the periphery of a circle. The ribs may thus be continuously curved along the whole or a part of the extension from the inner position to the outer position. The circle may be interpreted to include not only a circle with one constant radius, but also circles having for instance an elliptic shape.

According to an embodiment of the invention, each of the ribs is curved in the same manner from the inner position in relation to a rotary direction around the longitudinal central axis. Thus each of the ribs may be curved to the left or to the right from the inner position.

According to a less preferred embodiment, the ribs may be curved in different directions. For instance, every second rib may be curved to the left and every second rib to the right.

According to an embodiment of the invention, a line through the inner position and the outer position of each of the ribs extends in a radial direction in relation to the longitudinal central axis.

According to an embodiment of the invention, the outer position is located at a distance from the side surface. This distance permits the cleaning liquid to pass between the rib and the side surface, and thus to ensure a proper cleaning in the area of the outer position of the ribs.

According to an embodiment of the invention, the annular bottom surface is substantially perpendicular to the longitudinal central axis. Thus, the annular bottom surface is substantially plane and may provide an advantageous support surface for an upper end surface of the teatcup received by the cleaning unit. The plane surface with the at least three ribs may prevent any pivoting of the teatcup.

According to an embodiment of the invention, each of the ribs have a constant height above the annular bottom surface. Thus, the height of each of the ribs may be equal.

According to an embodiment of the invention, each of the ribs defines an upper surface, wherein the upper surfaces of the ribs are configured to permit abutment to an upper end surface of the teatcup received by the cleaning unit.

According to an embodiment of the invention, the upper surfaces of the ribs are located in a common radial plane.

According to an embodiment of the invention, the side surface is configured to seal against an outer circumferential surface of the teatcup received by the cleaning unit. No cleaning liquid may thus escape between the side surface and the teatcup received in the cleaning unit.

According to an embodiment of the invention, the annular bottom surface surrounds a central depression and has an inner edge forming a transition to the central depression, wherein the inner position is located on the inner edge. The ribs thus extend to the central depression, ensuring an efficient influence on the cleaning liquid.

According to an embodiment of the invention, the cleaning unit comprises a supply rod member configured to permit supply of liquid into the gap and into the inner spacer of the teatcup received by the cleaning unit.

According to an embodiment of the invention, the supply rod member is configured to be introduced into an inner space of the teatcup received by the cleaning unit, and wherein the supply rod member comprises at least one aperture configured to be located partly in the inner space of the teatcup and partly opposite to the gap. The supply rod member may provide support for the teatcup received in the cleaning unit.

According to an embodiment of the invention, the cup-shaped member is made of a rubber-like material, for instance natural or synthetic rubber, thermoplastic elastomers etc.

The purpose is also achieved by the cleaning device initially defined, which comprises two or four cleaning units as defined above.

BRIEF DESCRIPTION OF THE DRAWINGS

The invention should now be explained more closely through a description of various embodiments and with reference to the drawings attached hereto.

DETAILED DESCRIPTION OF VARIOUS EMBODIMENTS

Figure 1:
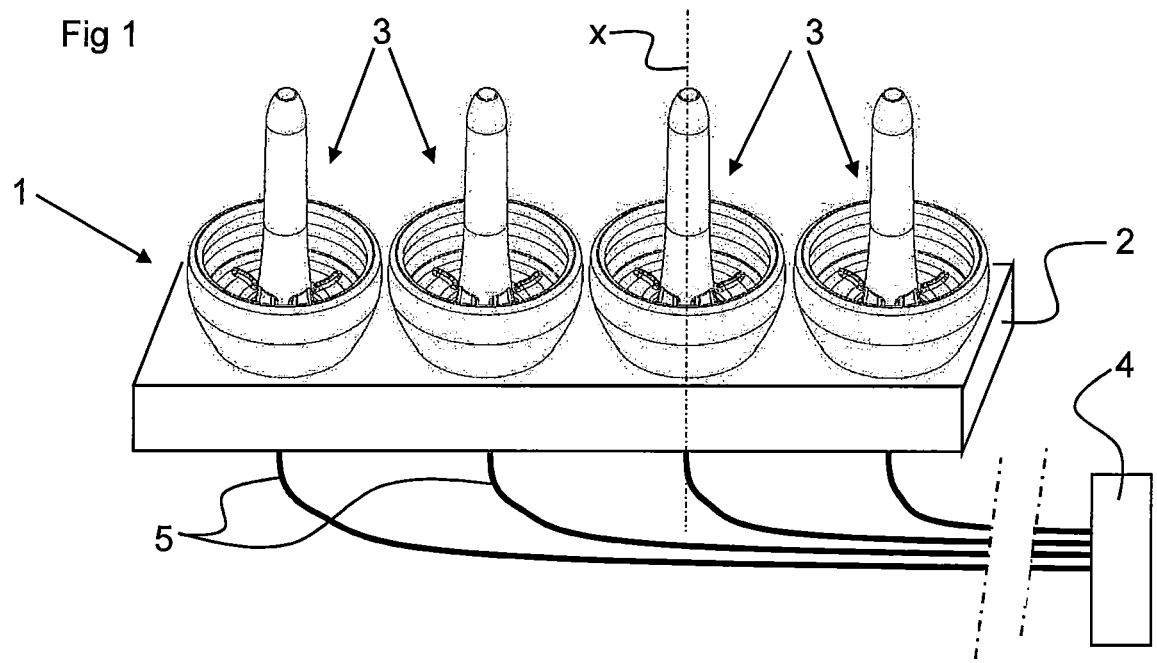
FIG. 1 discloses a perspective view of a cleaning device comprising four cleaning units according a first embodiment of the invention.
Figure 2:
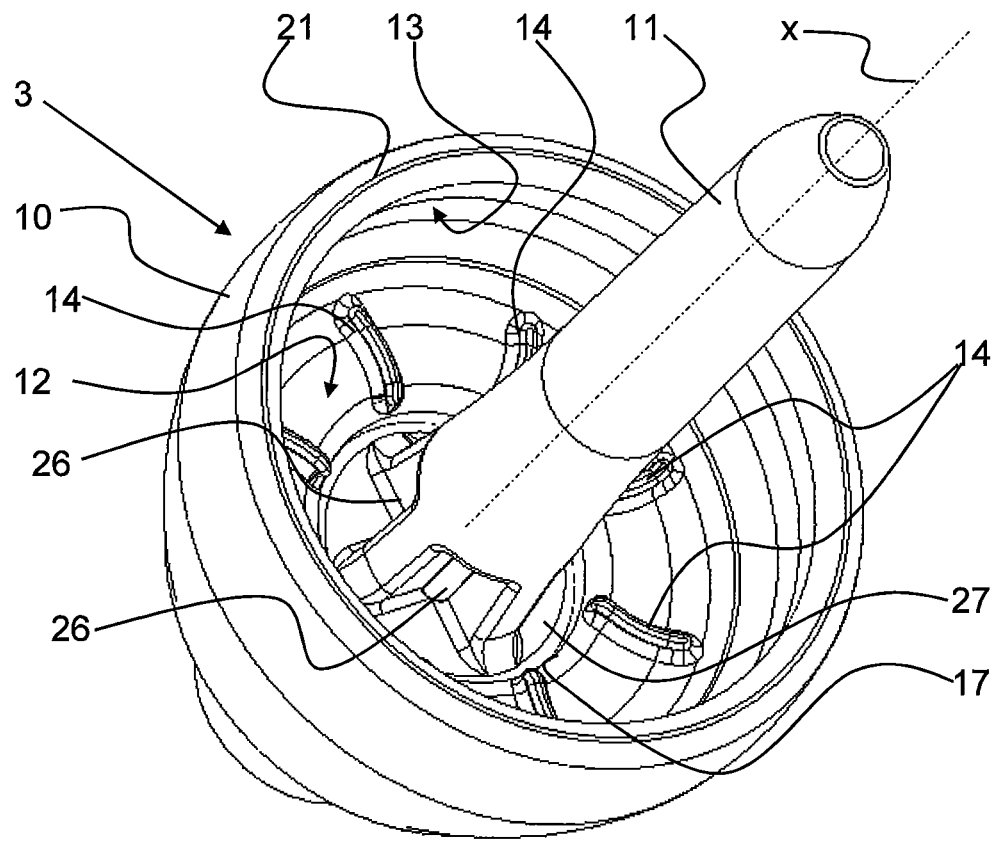
FIG. 2 discloses a perspective view of a cleaning unit of the cleaning device in FIG. 1.

FIG. 1 discloses a cleaning device 1 for cleaning teatcups of a milking apparatus. The cleaning device 1 comprises a shelf 2 and a number of cleaning units 3 mounted on the shelf 2. In the first embodiment, the cleaning device 1 comprises four cleaning units 3. Each cleaning unit 3 is connected to liquid source 4 for the supply of liquid, such as cleaning liquid, rinsing water etc. via a respective supply conduit 5.

Figure 3:
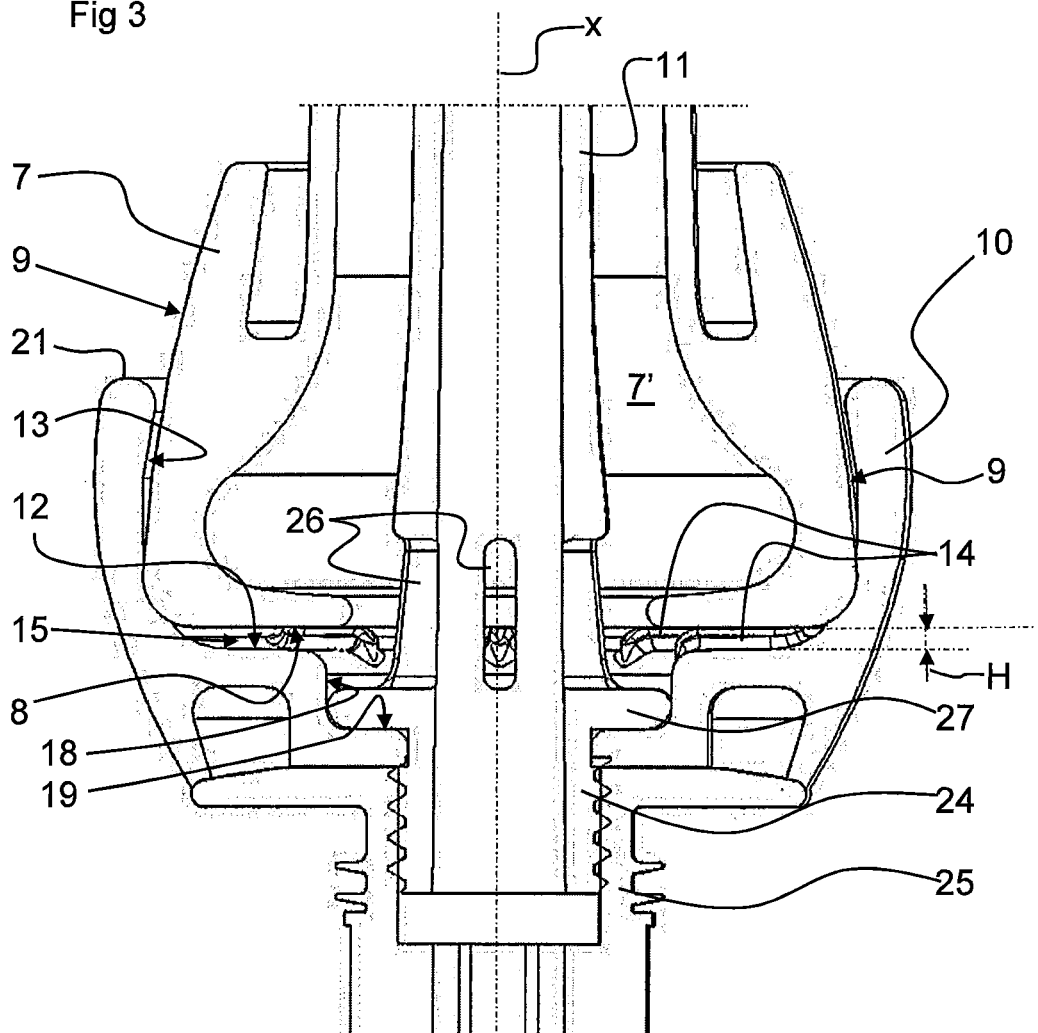
FIG. 3 discloses a longitudinal cross-sectional view through the milking unit in FIG. 2 with a teatcup received in the milking unit.

Each of the cleaning units 1 is configured for receiving a respective one of the teatcups 7 of the milking apparatus, see FIG. 3. Only an upper part of the teatcup 7 is illustrated in FIG. 3, in an upside down orientation. It can be seen that the teatcup 7 has an upper end surface 8 and an outer circumferential surface 9.

Each of the cleaning units 1 comprises a cup-shaped member 10 and a supply rod member 11.

The cup-shape member 10 may be made of an elastic material, such as a rubber-like material, for instance natural or synthetic rubber, thermoplastic elastomers etc. The cup shaped member 10 comprises an annular bottom surface 12 and a side surface 13. The annular bottom surface 12 and the side surface 13 form a cavity 10A, see FIG. 4, in which the teatcup 7 may be received as shown in FIG. 3. The annular bottom surface 12 extends around a longitudinal central axis x of the cleaning unit 3. The side surface 13 extends around the annular bottom surface 13 and faces the longitudinal central axis x.

At least three ribs 14 are provided on the annular bottom surface 12 and protrude from the annular bottom surface 12. According to the first embodiment, eight ribs 14 protrude from the annular bottom surface 12, see FIG. 6. It should be noted that the number of ribs 14 may be higher than three, and also higher than eight.

Figure 4:
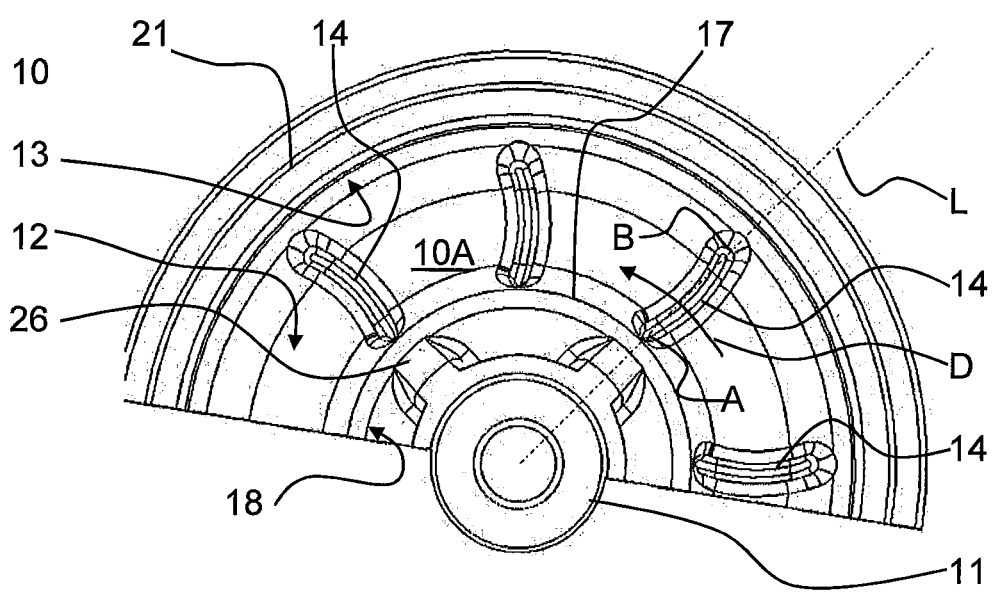
FIG. 4 discloses a view from above of the section disclosed in FIG. 3 without the teatcup.

Each of the ribs 14 has an extension between an inner position A and an outer position B on the annular bottom surface 12, see FIG. 4. The inner position A is located more closely to the longitudinal central axis x than the outer position B.

The ribs 14 are configured to create a gap 15 between the annular bottom surface 12 and the upper end surface 8 of the teatcup 7 received in the cleaning unit 3, see FIG. 3.

According to the first embodiment, each of the ribs 14 is curved along the extension, from the inner position A to the outer position B, when seen from above the annular bottom surface 12 in the direction of the longitudinal central axis along x.

According to another embodiment, each of the ribs 14 may be curved along a part of the extension from the inner position A to the outer position B, for instance along an inner part from the inner position A, along an outer part to the outer position B or along an intermediate part.

The extension, or part of the extension, of each of the ribs 14 may extend along a part of the periphery of a circle. Each of the ribs 14 may thus be continuously curved along the whole or a part of the extension from the inner position A to the outer position B. The circle may be interpreted to include not only a circle with one constant radius, but also circles having for instance an elliptic shape.

Figure 6:
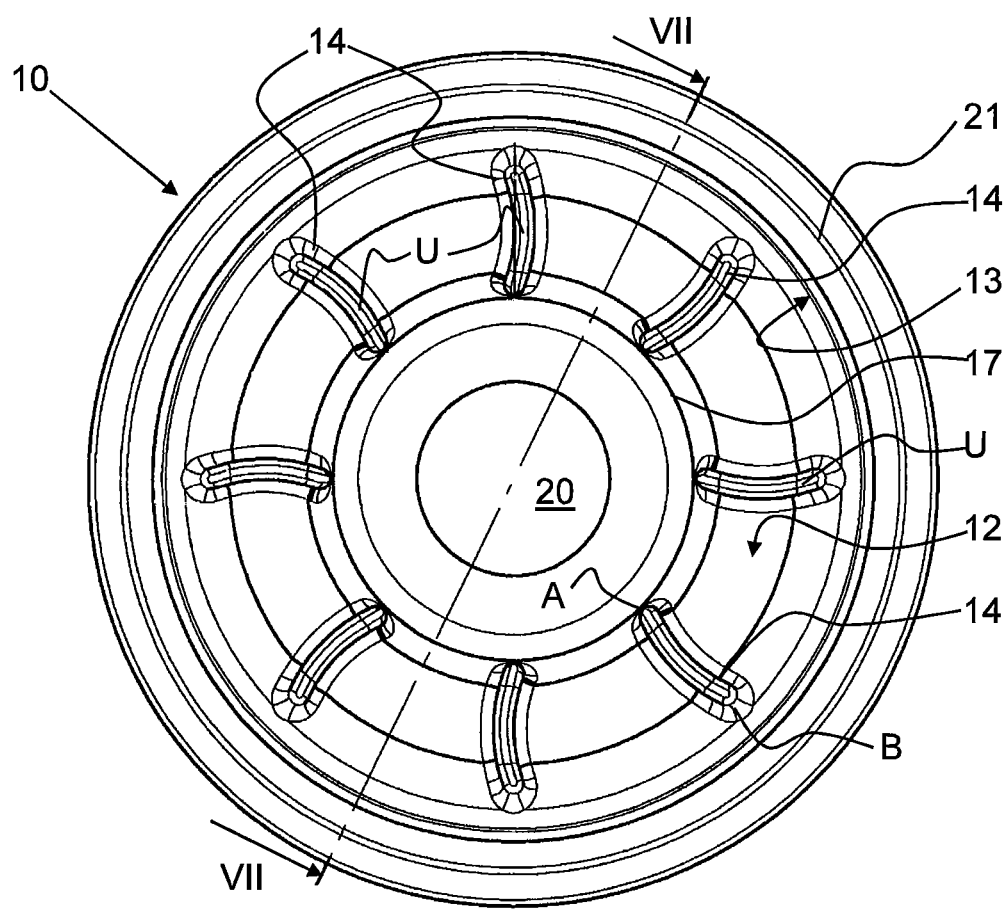
FIG. 6 discloses a view from above of the cup-shaped member in FIG. 5.

According to the first embodiment, each of the ribs 14 is curved in the same manner from the inner position A in relation to a rotary direction D around the longitudinal central axis x, see FIGS. 4 and 6. Thus, each of the ribs 14 may be curved to the left, as in the first embodiment, or to the right from the inner position A.

According to another, less preferred, embodiment, the ribs 14 may be curved in different directions. For instance, every second rib 14 may curved to the left and every second rib 14 to the right.

According to the first embodiment, a line L through the inner position A and the outer position B of each of the ribs 14 extends in a radial direction in relation to the longitudinal central axis x, see FIG. 4.

According to another embodiment, the line L may be inclined to the radial direction. For instance, the line L may be inclined forwards or rearwards with respect to the radial direction.

Figure 7:
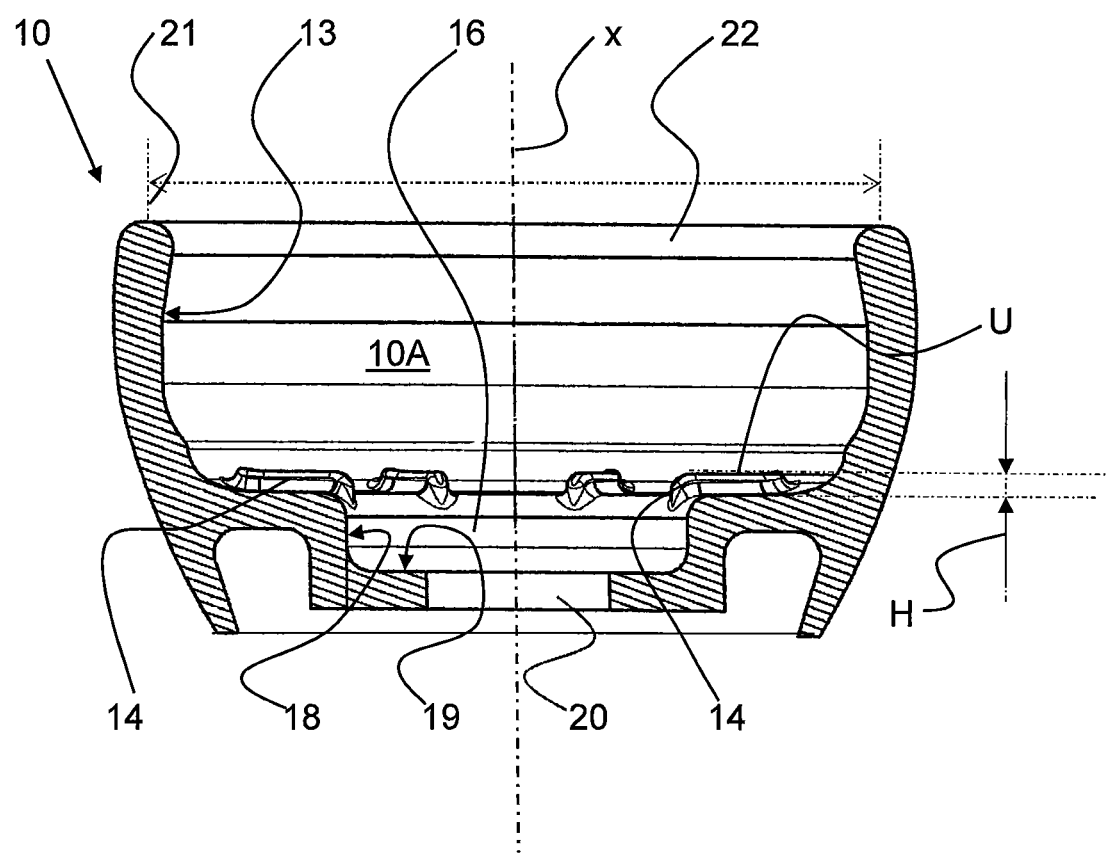
FIG. 7 discloses a cross-sectional view along the line VII-VII in FIG. 6.

The annular bottom surface 12 surrounds or encloses a central depression 16, see FIG. 7. The annular bottom surface 12 also has an inner edge 17 forming a transition to the central depression 16. The transition may be rounded or chamfered.

The central depression 16 may have a cylindrical side wall 18, or a substantially cylindrical side wall 18, and a bottom wall 19 surrounding a through-hole 20, see FIG. 7.

According to the first embodiment, the inner position A of each of the ribs 14 is located on the inner edge 17 as can be seen in FIGS. 4, 6 and 7.

According to another embodiment, the inner position A of each of the ribs 14 is located at a distance from the inner edge 17. The distance may be at least 0.5 mm, et least 1 mm, at least 2 mm or at least 3 mm. The distance may also be at most 3 mm, at most 2 mm or at most 1 mm.

According to the first embodiment, the outer position B of each of the ribs 14 is located at a distance from the side surface 13, see FIG. 7. The distance may be at least 0.5 mm, et least 1 mm, at least 2 mm or at least 3 mm. The distance may also be at most 3 mm, at most 2 mm or at most 1 mm.

According to another embodiment, the each of the ribs 14 extends to the side surface 13, i.e. outer position B is located at or on the side surface 13.

According to the first embodiment, the annular bottom surface 12 is perpendicular, or substantially perpendicular, to the longitudinal central axis x.

Each of the ribs 14 may have a constant, or substantially constant, height H above the annular bottom surface 12 along their extension, see FIGS. 3 and 7. The height H may be in the order of 1-2 mm. It follows that the height H also forms the height of the gap 15.

Each of the ribs 14 may define an upper surface U. The upper surface U may be straight or substantially straight, when seen in a radial plane, see FIG. 7, to permit the upper surfaces U of the ribs 14 to form a respective abutment to the upper end surface 8 of the teatcup 7 received by the cleaning unit 3, see FIG. 3. As mentioned above each of the ribs 14, and thus the extension of the upper surfaces U, may be curved when seen in the direction of the longitudinal central axis x, see FIG. 6.

Figure 5:
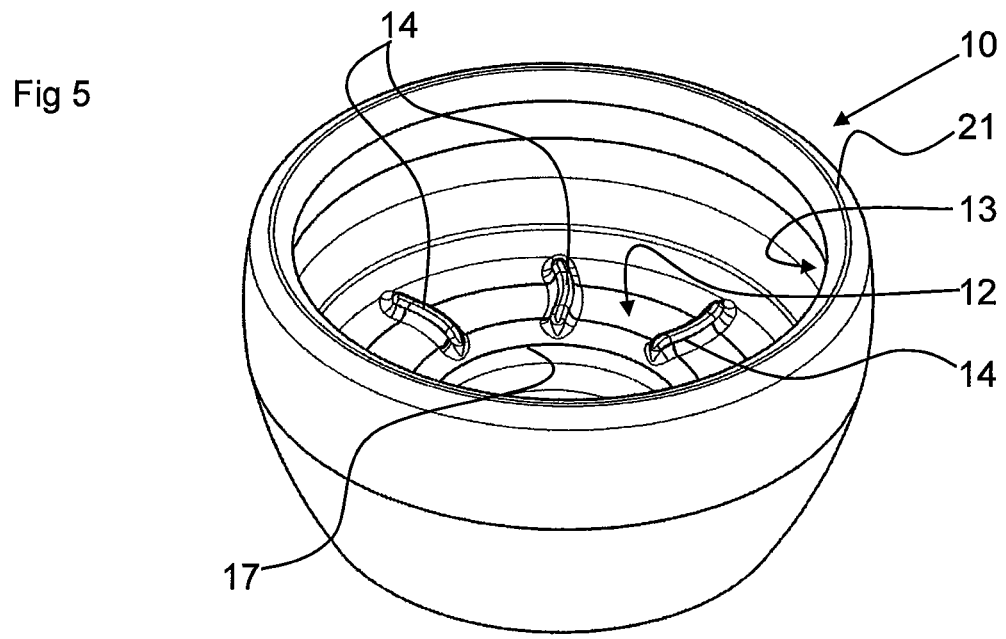
FIG. 5 discloses a perspective view of a cup-shaped member of the milking unit in FIG. 2.

Each of the ribs 14 slopes smoothly from the upper surface U to the annular bottom surface 12 as can be seen in the figures, especially in FIGS. 5-7.

In the first embodiment, the upper surfaces U of the ribs 14 are located in a common radial plane.

The side surface 13 is configured to seal against an outer circumferential surface 9 of the teatcup 7 received by the cleaning unit 3, see FIG. 3. The elastic material of the cup-shaped member permits the outer circumferential surface 9 to deform the cup-shaped member 10 and press the side surface 13 outwards, or slightly outwards when the teatcup 7 is received in the cleaning unit 3 as can be seen in FIG. 3.

The side surface 13 extends from the annular bottom surface 12 to a circular end 21. The circular end 21 may form a circular opening 22 to the cavity 10A. The circular opening 22 may have a diameter in the order of the diameter of the annular bottom surface 12.

As can be seen in FIG. 3, the supply rod member 11 is introduced into an inner space 7' of the teatcup 7 when the teatcup 7 is received by the cleaning unit 3 in the cup-shaped member 10.

The supply rod member 11 is mounted in the cup-shaped member and has a bottom part 24, which extends through the through-hole 20 and is provided with a screw thread to mate with a screw thread of a connector 25, see FIG. 3. The connector 25 may be mounted to the shelf 2 and may be connected to one of the supply conduits 5.

The supply rod member 11 is elongated and extends along the longitudinal central axis x beyond the cavity 10A and the circular end 21. In particular, the supply rod member 11 may have a length along the longitudinal central axis x only slightly shorter than the length of the inner space 7' to permit a secure support for the teatcup during the cleaning operation.

In the first embodiment, the supply rod member 11 comprises four apertures 26, which are located partly in the inner space 7' of the teatcup 7 and partly opposite to the gap 15 when the teatcup 7 is received in the cup-shaped member, see FIG. 3. In the first embodiment, the apertures 26 are located opposite to a respective rib 14, in particularly opposite to the inner position of a respective rib 14.

In other embodiments, the supply rod member 11 may comprise less than four, for instance two or three apertures 26, or more than four apertures 26.

The apertures 26 are provided above a flange 27 of the supply rod member 11. The flange 27 is comprised by the bottom part 24 and abuts the bottom wall 19 of the central depression 16, as can be seen in FIG. 3.

The supply rod member 11 is hollow and thus provides a passageway from the supply conduit 5 to the apertures 26. The supply rod member 11 is thus configured to permit supply of liquid from liquid source 4 and the supply conduit 5 into the gap 15 and into the interior of the teatcup 7 received by the cleaning unit 3 via the apertures 26.

The liquid supplied from the liquid source 4 via the supply conduit and the apertures 26 into the inner space 7' of the teatcup 7 may clean and rinse the inner space 7' of the teatcup 7, and may be withdrawn from the inner space 7' via the milk conduit (not disclosed) in a manner known in the art.

The liquid supplied from the liquid source 4 via supply conduit 5 and the apertures 26 into the gap 15 may clean and rinse the exterior surfaces of the teatcup 7 which is received in the cup-shaped member 10 and also clean and rinse the annular bottom surface 12 and a lower part of the side surface 13 as well as the ribs 14. The curved ribs 14 may force the liquid to rotate and reach all areas of the annular bottom surface 12, in particular the area of the corner between the annular bottom surface 12 and the side surface 13, and the curved ribs 11. A more efficient rinsing of the cup-shaped member 10 may thus be achieved, preventing any build-up of agglomerations of dirt and other particles. The distance between the outer position B and the side surface 13 permits the liquid to pass between the ribs 14 and the side surface 13, and thus to ensure proper cleaning in the area of the outer position B of the ribs 14.

The present invention is not limited to the embodiments disclosed but may be varied and modified within the scope of the following claims.

The invention claimed is:

1. A cleaning unit for a cleaning device for cleaning teatcups of a milking apparatus, the cleaning unit being configured for receiving a teatcup of the milking apparatus, the cleaning unit comprising a cup-shaped member comprising:
   an annular bottom surface extending around a longitudinal central axis of the cleaning unit;
   a side surface extending around the annular bottom surface and facing the longitudinal central axis; and
   at least three ribs protruding from the annular bottom surface and having an extension between an inner position and an outer position on the annular bottom surface,
   wherein the inner position is located more closely to the longitudinal central axis than the outer position,
   wherein the ribs are configured to create a gap between the annular bottom surface and an end surface of the teatcup received in the cleaning unit, and
   wherein each of the ribs is curved along at least a part of the extension.

2. The cleaning unit according to claim 1, wherein at least said part of the extension of each of the ribs extends along a part of the periphery of a circle.

3. The cleaning unit according to claim 2, wherein each of the ribs is curved in the same manner from the inner position in relation to a rotary direction around the longitudinal central axis.

4. The cleaning unit according to claim 1, wherein each of the ribs is curved in the same manner from the inner position in relation to a rotary direction around the longitudinal central axis.

5. The cleaning unit according to claim 1, wherein a line through the inner position and the outer position of each of the ribs extends in a radial direction in relation to the longitudinal central axis.

6. The cleaning unit according to claim 1, wherein the outer position is located at a distance from the side surface.

7. The cleaning unit according to claim 1, wherein the annular bottom surface is substantially perpendicular to the longitudinal central axis.

8. The cleaning unit according to claim 1, wherein each of the ribs has a constant height above the annular bottom surface.

9. The cleaning unit according to claim 1, wherein each of the ribs defines an upper surface, and
wherein the upper surfaces of the ribs are configured to permit abutment to the upper end surface of the teatcup received by the cleaning unit.

10. The cleaning unit according to claim 9, wherein the upper surfaces of the ribs are located in a common radial plane.

11. The cleaning unit according to claim 1, wherein the side surface is configured to seal against an outer circumferential surface of the teatcup received by the cleaning unit.

12. The cleaning unit according to claim 1, wherein the annular bottom surface surrounds a central depression and has an inner edge forming a transition to the central depression, and
wherein the inner position is located on the inner edge.

13. The cleaning unit according to claim 1, further comprising a supply rod member configured to permit supply of liquid into the gap and into an inner space of the teatcup received by the cleaning unit.

14. The cleaning unit according to claim 13, wherein the supply rod member is configured to be introduced into an inner space of the teatcup received by the cleaning unit, and wherein the supply rod member comprises at least one aperture configured to be located partly in the inner space of the teatcup and partly opposite to the gap.

15. The cleaning unit according to claim 1, wherein the cup-shaped member is made of rubber.

16. A cleaning device for cleaning teatcups of a milking apparatus, comprising two or four of the cleaning units according to claim 1.

17. The cleaning unit according to claim 1, wherein the cup-shaped member is made of a thermoplastic elastomer.

18. The cleaning unit according to claim 1 in combination with the teatcup of the milking apparatus, wherein, with the teatcup received in the cleaning unit, the ribs create the gap between the annular bottom surface of the cup-shaped member and the end surface of the teatcup.

19. The cleaning unit according to claim 1 in combination with the teatcup of the milking apparatus, wherein,
with the teatcup received in the cleaning unit, the ribs create the gap between the annular bottom surface of the cup-shaped member and the end surface of the teatcup,
each of the ribs defines an upper surface,
with the teatcup received in the cleaning unit, the upper surfaces of the ribs abutment to the upper end surface of the teatcup, and
with the teatcup received in the cleaning unit, the side surface seals against an outer circumferential surface of the teatcup.

20. The cleaning unit according to claim 1 in combination with the teatcup of the milking apparatus, wherein,
at least said part of the extension of each of the ribs extends along a part of the periphery of a circle,
each of the ribs is curved from the inner position in relation to a rotary direction around the longitudinal central axis,
a line through the inner position and the outer position of each of the ribs extends in a radial direction in relation to the longitudinal central axis,
the outer position is located at a distance from the side surface,
each of the ribs defines an upper surface that permits abutment to the upper end surface of the teatcup received by the cleaning unit,
the side surface seals against an outer circumferential surface of the teatcup received by the cleaning unit,
the annular bottom surface surrounds a central depression and has an inner edge forming a transition to the central depression, the inner position being located on the inner edge,
further comprising a supply rod member configured to permit supply of liquid into the gap and into an inner space of the teatcup received by the cleaning unit,
wherein the supply rod member is configured to be introduced into an inner space of the teatcup received by the cleaning unit.

* * * * *